Nov. 8, 1932.  F. J. WESTROPE  1,887,077
ADJUSTABLE SEAT
Filed Nov. 12, 1928  3 Sheets-Sheet 1
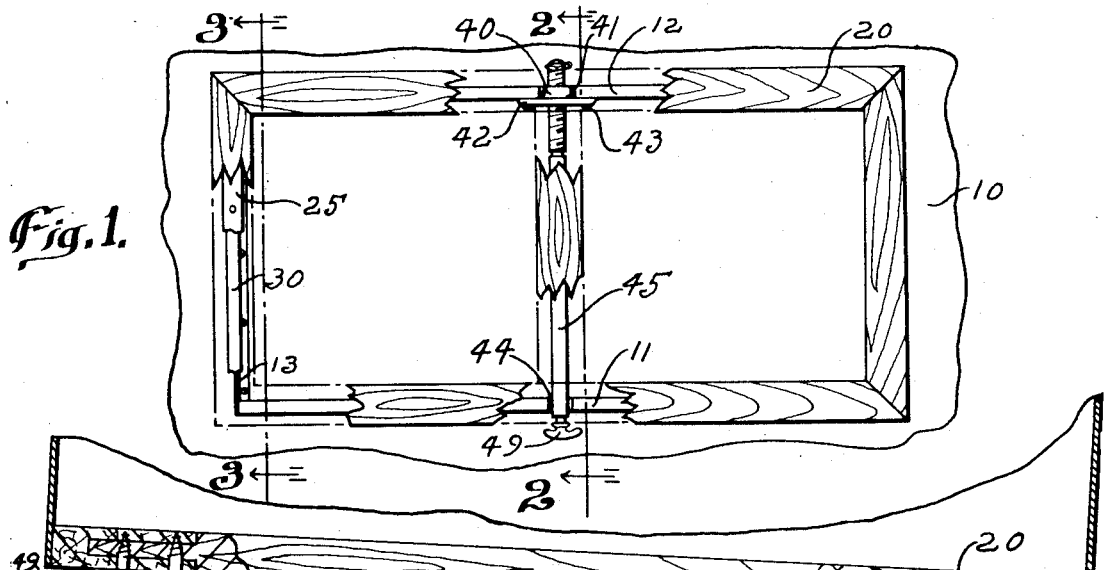
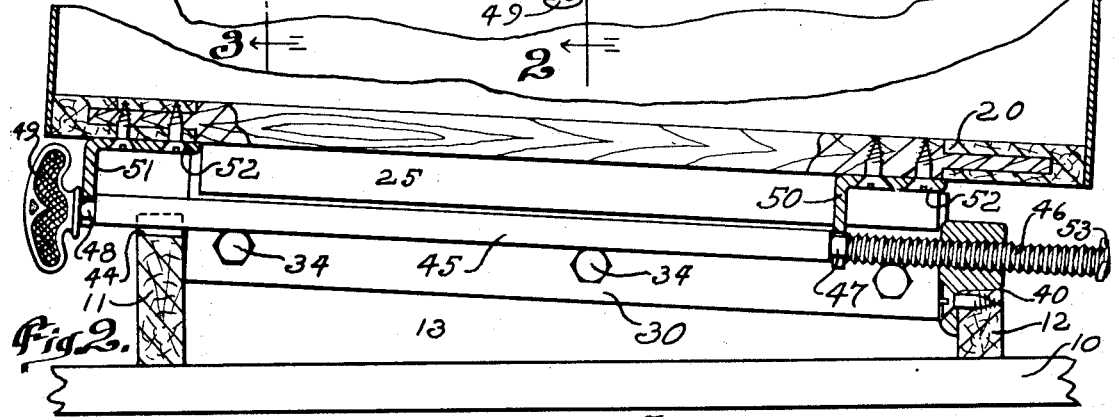
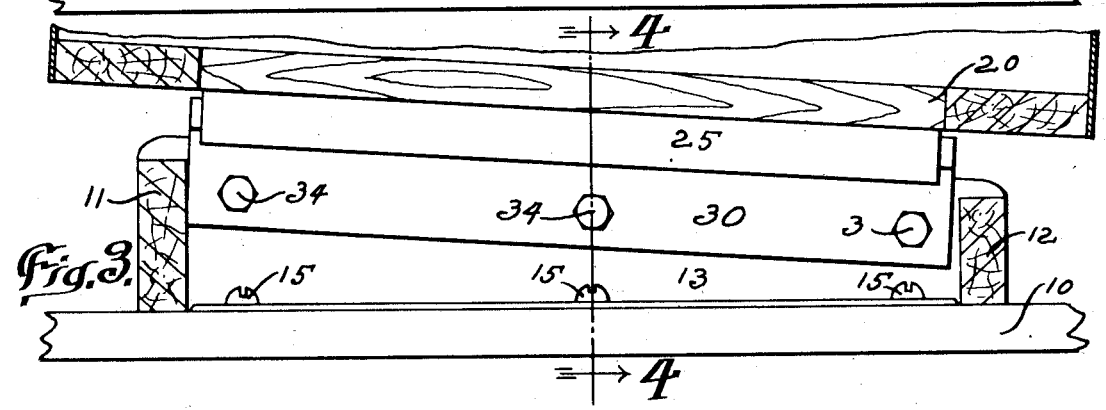
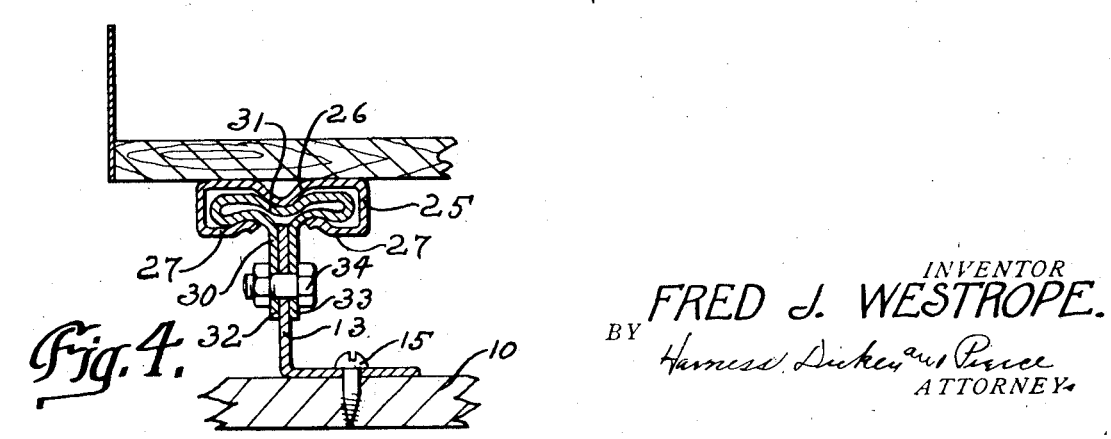
INVENTOR
FRED J. WESTROPE.
BY
ATTORNEY Nov. 8, 1932.  F. J. WESTROPE  1,887,077
ADJUSTABLE SEAT
Filed Nov. 12, 1928  3 Sheets-Sheet 2
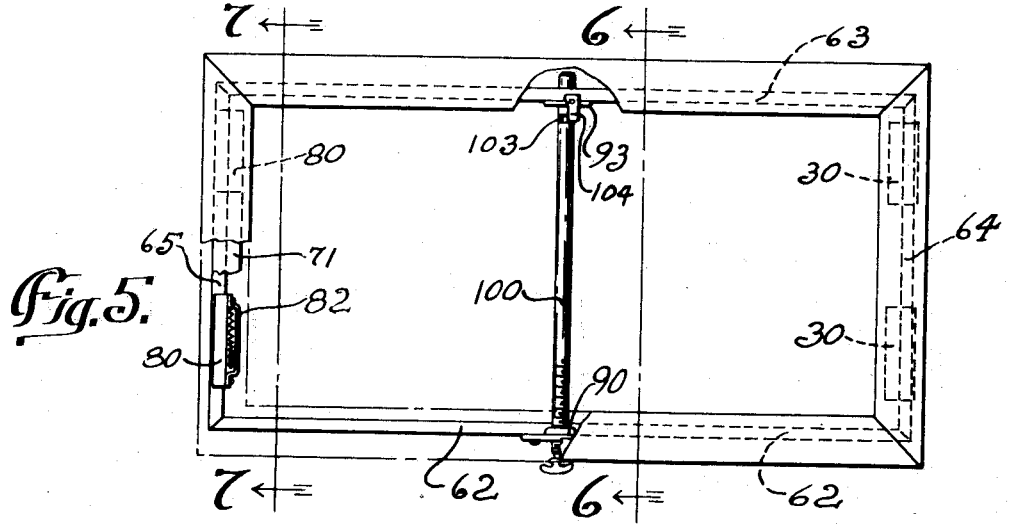
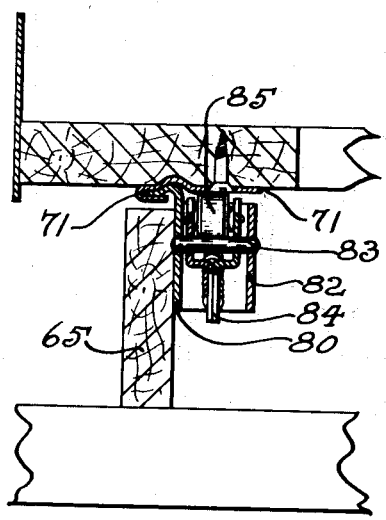
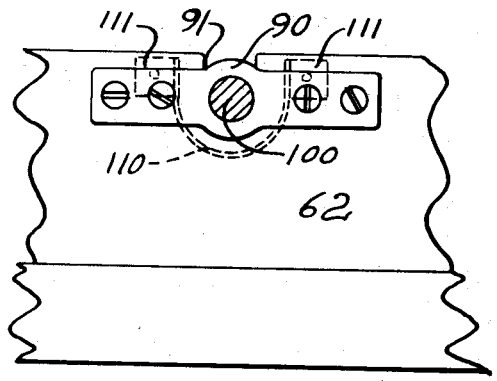
INVENTOR
FRED J. WESTROPE.
BY
Harness, Dickey and Pierce
ATTORNEYS Nov. 8, 1932.  F. J. WESTROPE  1,887,077
ADJUSTABLE SEAT
Filed Nov. 12, 1928  3 Sheets-Sheet 3
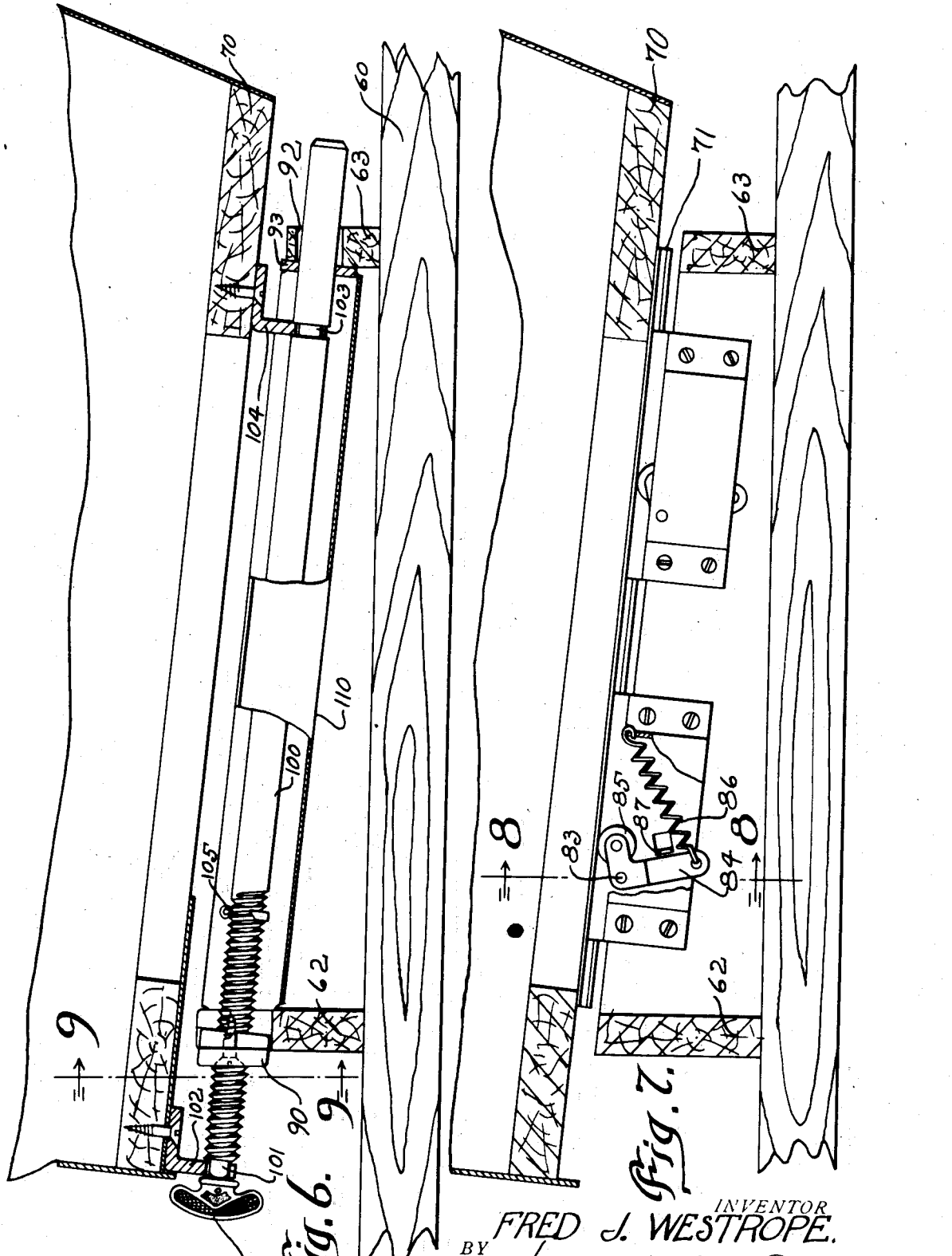
INVENTOR
FRED J. WESTROPE.
BY Harness, Dickey and Pierce
ATTORNEYS Patented Nov. 8, 1932

1,887,077

UNITED STATES PATENT OFFICE

FRED J. WESTROPE, OF DETROIT, MICHIGAN, ASSIGNOR TO THE MURRAY CORPORATION OF AMERICA, A CORPORATION OF DELAWARE

ADJUSTABLE SEAT

Application filed November 12, 1928. Serial No. 318,663.

This invention relates to adjustable seats. It is particularly useful in connection with vehicle seats, and especially the front or driver's seat of the motor vehicle.

The principal object of my invention is to provide a front or driver's seat for a vehicle which may be readily moved to or from the steering mechanism or controls of the vehicle to accommodate the physical peculiarities of the person operating the vehicle. The application of the invention is not limited to vehicle seats, but may be applied to any seat in which similar adjustability is desired.

With the above and other objects in view, my invention consists in the combination and construction of the various parts of my improved device as described in specifications, claimed in my claims, and shown in the accompanying drawings in which:

Fig. 1 is a plan view of a seat frame mounted upon a support frame having parts broken away showing the adjustable mechanism.

Fig. 2 is a view taken on line 2—2 of Fig. 1.

Fig. 3 is a view taken on line 3—3 of Fig. 1.

Fig. 4 is a view taken on line 4—4 of Fig. 2.

Fig. 5 is a plan view of a seat frame mounted upon a support frame having parts broken away, showing the adjustable mechanism of a modified form of my invention.

Fig. 6 is a view taken on line 6—6 of Fig. 5 with parts broken away.

Fig. 7 is a view taken on line 7—7 of Fig. 5 with parts broken away.

Fig. 8 is a view taken on line 8—8 of Fig. 7.

Fig. 9 is a view taken on line 9—9 of Fig. 6.

The numeral 10 indicates a vehicle floor. The numeral 11 designates the forward transverse member of the seat support. The numeral 12 is the rear transverse member of the seat support. The numeral 13 is the right side member of the seat support.

The forward and rear transverse members 11 and 12 of the seat support are preferably of wood as shown, the forward member 11 being higher than the rear member 12 to provide for the desired inclination of the seat. The side member 13 of the seat support, which is secured to the right ends of the members 11 and 12 is preferably of steel of angle shape in cross section as shown more clearly in Fig. 4, positioned with one flange extending upwardly and with the other flange lying horizontally upon the vehicle floor 10 and secured thereto by screws 15. It is understood that a similar side member 13 is secured to the left ends of the members 11 and 12 and secured to the floor of the vehicle in the manner described. The members 13 have an inclined upper edge as shown in Figs. 2 and 3 co-operating with the members 11 and 12 to give the seat the desired inclination.

The seat itself, of which only the bottom part of the frame is shown, may be designated by the numeral 20 and comprises the usual rectangular bottom frame which is shown as constructed of wood, although it may, if desired, be of metal. The forward and rear and side members of the seat frame are so joined as to align substantially with the forward and rear and side members of the seat support. Secured to the side members of the seat frame on the under sides thereof are guide members 25, shown clearly in cross section in Fig. 4. These guide members each comprise a metal channel and are of a length slightly less than the side members of the seat frame to which they are attached. They are attached to the seat frame by screws or other suitable means (not shown) which are inserted through suitable apertures (not shown) formed in the bottoms of the channels. The channels are formed with a ridge 26 extending longitudinally of their central portions as shown in Fig. 4. The channel sides have laterally and inwardly extending flanges 27 which are spaced on the channel bottom and the ridge 26. The edges of these lateral flanges 27 are rounded and bent inwardly toward the channel bottom and the ridge 26 as shown in Fig. 4.

Secured to each of the side members 13 of the seat support is a track member 30 which comprises a sheet of metal folded to a T shape in cross section as shown in Fig. 4. The upper section of the cross bar of the T is formed with a grooved or depressed portion 31 which is adapted to receive the ridge 26 of the guide 25. The leg member of the track comprises two downwardly extending flanges 32 and 33 which extend in parallel and spaced relation to each other, and which are adapted to receive between them the upstanding flange of the support member 13. The flanges 32 and 33 and the upstanding flange of the member 13 are provided with aligned apertures through which the bolts 34 are inserted to secure the track members 30 to the support members 13. The bar of the T is formed by return bent portions of the metal sheet as shown in Fig. 4, which are spaced somewhat from each other. Both the guide members 25 and the track members 30 are preferably formed of spring steel and are fitted together so that the offset ends of the flanges 27 bear against the under sides of the bar of the track member 30 as shown in Fig. 4, and are so arranged that the offset ends of the inturned flanges 27 and the downwardly extending ridge 26 will hold the upper and under portions of the bar of the track member 30 in spaced relation to the inside of the guide member 25. Thus when the seat is carrying a load the ridge 26 of the guide 25 will bear downwardly into the grooved portion 31 of the track member 30, and thus tend to force the folded portions of the track member 30 together and relieve the pressure of the offset ends of the flanges 27 against the under sides of the horizontal portion or bar of the track member 30, thereby relieving the friction so that the guide members 25 and the track members 30 will slide easily relative to each other, even when loaded.

The track members 30 are of a length just sufficiently less than that of the side members 13 so that they may be fitted between the transverse members 11 and 12 as shown in Figs. 2 and 3. It will be understood of course that the track members 30 may be secured to the seat bottom and the guide members 25 may be secured to the seat support without materially affecting the function or operation of the members. It is preferred however to position them as shown, one of the most obvious reasons being that there is not much likelihood of dirt or other foreign matter getting into the guide members 25 and interfering with their co-operation with the track members 30. If the track and guide members were reversed as to position, dirt would very likely accumulate in the guide members 25.

A notch 40 is provided in the upper central portion of the rear transverse member 12 as shown in Fig. 1, and in this notch is positioned a threaded nut 41 which has apertured lateral flanges 42 by which it may be suitably secured by screws 43 to the member 12. Operating in the nut 41 is a screw shaft 45 which has external threads 46 formed on the rear end thereof and adapted to turn through the threaded nut 41. The screw shaft is of sufficient length to extend beyond both the front and rear transverse support members 11 and 12. The nut 41 is positioned so that the screw member 45 will extend in inclined plane to clear, or substantially clear, the top of the forward transverse member 11. I have in this showing provided a notch 44 in the front transverse support member 11 to accommodate the screw member 45.

Secured to the bottom of the seat frame 20 are bracket members 50 and 51 as shown in Fig. 2. Each of the bracket members 50 and 51 are of angle shaped metal, having one flange lying against and secured to the seat bottom by screws 52, and having the other flange depending from the seat bottom as shown. In the depending end of the bracket 50 is formed an inverted U shaped slot which fits the reduced portion 47 of the screw member 45. This reduced portion 47 is located just forward of the threaded portion 46 as shown in Fig. 2. The forward end of the screw member 45 has a reduced portion 48 which is journaled in a suitable aperture in the depending end of the bracket 51. The brackets 50 and 51 are preferably so assembled relative to the screw member 45 that the bracket 51 functions chiefly to draw the seat with the screw member while the bracket 50 functions chiefly to prevent lateral movement of the seat relative to the fixed support and the screw bar. It is also preferable to give the U shaped end of bracket 51 plenty of side clearance in the reduced portion 47 of the screw member in order to relieve the friction when the screw member is being turned. Secured to the reduced portion 48 forward of the bracket 51 is a handle member 49 by means of which the screw member 45 may be manually operated.

In operation, the screw member 45 is turned so that it moves forwardly or rearwardly through the nut 41 and by means of its connection with the seat bottom 20 through the brackets 50 and 51 it moves the seat with the guide members 25 forwardly or rearwardly on the track members 30. Suitable stops (not shown) may be provided either on the bottom of the seat to contact with the front and rear transverse support members 11 and 12 to limit the moving of the seat relative thereto, or the stop members may be in the form of cotter keys such as 53, shown in the end of the screw member 45, and which limits the movement of the screw member through the nut 41. A suitable aperture may be formed in the forward portion of the threaded portion 46 of the screw member 45, and a cotter key inserted therethrough forward of the nut 41, which would limit the rearward movement of the screw member 45. This is not shown.

I regard the guide member 25 and the track members 30 as particularly efficient and satisfactory in performance. They not only serve to eliminate any rattling movement of the seat relative to its support but they also eliminate the tendency of one side of the seat to advance faster than the other side, which is usually due to the binding of tracks and guides. The tension with which the offset ends of the flanges 27 tend to hold the ridge 26 in the groove 31 of the track member, effectively eliminates rattling. The rounded bearing of the ridge 26 with the grooves 31 and the rounded bearing of the offset ends of the flanges 27 against the under side of the track member 30, together with the clearance provided between the ends and upper and lower surfaces of the horizontal portion of the track member 30, and the inner surfaces of the guide members 25 effectively eliminate any tendency to bind. If desired, a ridge may be formed in the track members 30 instead of the groove 31 and a groove formed in the guide member 25 instead of the ridge 26 to produce the same effect in operation.

Referring to Figs. 5, 6, 7, 8 and 9 showing the modification of the device, the vehicle floor or fixed support for the seat is designated by the numeral 60. Upon the floor 60 is positioned a frame or seat support comprising front and rear rails 62 and 63 which are positioned in spaced and parallel relation. Joining the ends of the front and rear rails are the side rails 64 and 65. Secured to the bottom of the seat frame 70 are metal guide members 71. These guides 71 are positioned at each side of the seat bottom and aligned substantially with the side rails 64 and 65 of the supporting frame. The guides 71 are shown in cross sections in Fig. 8. Secured to the inside of the rails 64 and 65 are track members 80 in the form of metal plates having outwardly extending lateral flanges formed on their upper edges and spaced above the upper surfaces of the rails 64 and 65 and formed to fit the slide in the guides 71 as shown in Fig. 8. I preferably place two of the members 80 on each rail 64 and 65 as indicated in Figs. 5 and 6, although single or any number of such members of desired length may be used on each rail. Secured over the track plates 80 are U brackets or plates 82. Extending between the U-shaped portion of the plate 82 and the plate 80 is a pivot pin 83 upon which is pivotally mounted a rocker arm 84 as shown in Figs. 7 and 8. The rocker arm is of angle shape in side elevation shown in Fig. 7 and the elbow portion and short arm of the member are bifurcated as shown in Fig. 8. The rocker arm 84 is mounted upon the pivot pin 83 at its elbow as shown and a roller 85 is mounted thereon in the bifurcated end of the short arm of the member 84 in position to bear upon the adjacent surface of the guide 71 or of the bottom of the seat frame. Attached to the end of the longer arm of the member 84 is one end of a coil spring 86, the other end of which is attached to the upper edge of the U-shaped bracket 82. Struck out of the member 80 is a lug 87 which extends adjacent to and in front of the longer arm of the member 84 and limits its movement and prevents the long arm of the member 84 from working upwardly beyond the top of the U-brackets 82. The spring 86 is tensioned to hold the roller 85 against the adjacent surface of the guide 71 or the bottom of the seat frame with sufficient force to take up any play between the co-operating parts of the track 80 and the guide 71 and thereby eliminate rattling. A similar anti-rattle mechanism is attached to each track 80 as described. Secured in the forward rail 62 is a nut 90 which has lateral flanges attached to the rail at each side of the notch 91 with which the nut portion 90 aligns. In the central portion of the rear rail 63 is provided an opening 92 as shown in Fig. 6, and on the inner side of the rail and over the opening is secured a metal plate 93 which has an opening therein aligning with the opening 92. A screw member 100 is provided which is threaded in its forward portion as indicated in Fig. 6 and which is not threaded in its central and rear portion. The forward threaded portion works through the threaded nut 90. On the forward end of the screw member 100 is a reduced portion 101 which is journalled in the end of a bracket member 102 attached to the forward edge of the seat frame. Attached to the extreme forward end of the screw member 100 beyond the reduced portion 101 is a suitable crank or other device 106 for tuning the screw member in the nut 90. The rear end of the screw member 100 extends through the opening in the plate 93 and the opening 92 in the rear rail 63. The opening 92 and the opening in the plate 93 are of a size to permit the rear portion of the screw member 100 to slide readily therethrough. The screw member 100 has a reduced portion 103 adjacent the rear end which fits in the inverted U-shaped ends of a bracket 104 attached to the rear portion of the seat. The U-shaped portion of the bracket fits into the slot around the reduced portion 103 of the screw member 100 and acts to carry the screw member 100 with the seat as it moves. A stop 105 in the form of a cotter key is provided in the rear part of the threaded portion of the screw member 100 and acts to stop the forward movement of the screw member 100 through the nut 90. A metal housing member 110 semicylindrical in shape is formed to enclose the screw member 100 against the seat bottom between the front rail 62 and the rear rail 63 and is fastened at its ends to the rails as shown by the dotted lines at 111 in Fig. 9.

In operation, the seat may be adjusted forwardly or rearwardly relative to its support by turning the crank handle 106 on the forward end of the screw member 100. This causes the screw to turn and advance or recede as desired through the nut 90 and by means of the brackets 102 and 104 to carry the seat with it.

It will be obvious that various changes may be made in the arrangement, combination and construction of the various parts of my improved device without departing from the spirit of my invention, and it is my intention to cover by my claims such changes as may be reasonably included within the scope thereof.

What I claim is:

1. A movable seat, a fixed support therefor, metal track members secured to said support in parallel relation to each other, each of said track members comprising a flattened hollow resilient horizontal member secured to said fixed support, metal guide members secured to the bottom of said seat and positioned to slidably engage said track members, each of said guide members comprising a channel member having a raised and rounded bottom portion and inturned side flanges having inwardly offset and rounded end portions, said guide members being adapted to embrace said track members with said rounded bottom portion bearing upon the upper surface thereof and the offset rounded ends of said inturned flanges bearing against the under sides thereof, and manually operable means secured to said seat and fixed support for moving said seat relative to said support.

2. A movable seat, a fixed support therefor, metal track members secured to said fixed support in parallel relation to each other, each of said track members comprising a flattened hollow resilient horizontal portion for the track proper, and vertical parallel portions secured to said fixed support, said horizontal portion having a rounded depression extending longitudinally of its upper surface and having rounded depressions extending longitudinally of the under sides thereof, metal guide members secured to the bottom of said seat and positioned to slidably engage said track members, each of said guide members comprising a channel having a rounded ridge extending longitudinally of its bottom portion and having inturned flanges with inwardly offset and rounded edges, said guide members being adapted to embrace said track members with said raised rounded bottom portions bearing in the longitudinal depressions in the upper surfaces of the horizontal portions of said track members, and with the rounded offset edges of the inwardly extending flanges bearing in the depressions in the under sides of the horizontal portions of said track members, and means secured to said seat and fixed support for moving said seat relative to said support.

3. A sliding connection for a movable seat and a fixed support comprising a longitudinally extending hollow T-shaped member having a longitudinally extending groove in the cross bar portion thereof, a channel substantially encompassing said cross bar and having a raised longitudinal ridge in its bottom bearing in the groove in said T-shaped member and having inturned side flanges with inwardly offset rounded edges bearing against the sides of said T-shaped member opposite said longitudinal bead.

4. A slidable connector for a movable seat and a fixed support including, in combination, a longitudinally extending sheet metal member folded into T shape, the cross bar of the member formed by reversely bent portions being provided with a medial groove along its longitudinal dimension, and an inverted channel element receiving said cross bar portion of the member and provided with a ridge portion in engagement with said groove.

FRED J. WESTROPE.